United States Patent [19]
Barton et al.

[11] Patent Number: 5,822,015
[45] Date of Patent: Oct. 13, 1998

[54] PROVIDING AN ACCURATE TALLY INDICATION OF SOURCES IN USE FOR OUTPUT

[75] Inventors: Nicholas Barton, Camberley; Antony Richard Jones, Farnborough; Hugh Kendal Littlejohn, Wokingham, all of United Kingdom

[73] Assignee: Questech Limited, Wokingham, United Kingdom

[21] Appl. No.: 563,231

[22] Filed: Nov. 28, 1995

[30] Foreign Application Priority Data

Dec. 1, 1994 [GB] United Kingdom .................... 9424388

[51] Int. Cl.$^6$ ....................................................... H04N 9/74
[52] U.S. Cl. ........................... 348/585; 348/564; 348/588
[58] Field of Search .................................... 348/585, 564, 348/588, 563, 720, 721, 13, 705, 584, 385

[56] References Cited

U.S. PATENT DOCUMENTS

| | | | |
|---|---|---|---|
| 4,360,831 | 11/1982 | Kellar ........................................ | 348/585 |
| 4,758,892 | 7/1988 | Bloomfield .............................. | 348/585 |
| 4,994,916 | 2/1991 | Pshtissky et al. ....................... | 358/181 |
| 5,481,297 | 1/1996 | Cash et al. ................................ | 348/13 |
| 5,508,733 | 4/1996 | Kassatly .................................... | 348/13 |

FOREIGN PATENT DOCUMENTS 0 239 262 A2  9/1987  European Pat. Off. ........ H04N 5/262

OTHER PUBLICATIONS

Ohsaki et al., *Institute of Electrical and Electronics Engineers*, vol. 2, May 1, 1994, "transmission Structure of Digital Broadcasting", New Orleans, May 1–5, 1994, pp. 853–858.

*Primary Examiner*—Victor R. Kostak
*Attorney, Agent, or Firm*—Jacobson, Price, Holman & Stern, PLLC

[57] ABSTRACT

In the processing of digital video signals there is provided in association with each signal an accompanying tally signal which provides an instantaneous identification of one or more signal sources from which the information contained in each pixel of a picture image has originated. The format of the tally signal may enable processing thereof to identify all signal sources contributing to a particular image area, to pixels of a mixed image or to any given field or frame of a video image signal. The signal may be encoded in the format of the digital chrominance signal component of a color picture signal and combined with a conventional key signal which is encoded in the format of a digital luminance signal so that the combined signal has the format of a color picture signal.

20 Claims, 3 Drawing Sheets

PROVIDING AN ACCURATE TALLY INDICATION OF SOURCES IN USE FOR OUTPUT

BACKGROUND OF THE INVENTION

In television production it is common to use several cameras and other picture sources to produce one scene, combining the pictures from the cameras and other sources to create a finished program. The process of combining the pictures is performed by a variety of electronic devices, commonly known as vision mixers and digital video effects equipment (DVE).

It is desirable, during such a production, to be able to indicate, to the performers and the production staff, which picture sources are currently providing the pictures which make up the outgoing program. This is commonly done by means of "Tally Indicators" which are coloured lights mounted in various positions, often on the cameras themselves, and by tally indications built in to other types of equipment.

It is desirable to have these indicators respond automatically to the controls used to select the picture sources, so that when the operator selects a source then the appropriate tally indication will be turned on at once. This may be achieved simply when only one picture is present in the outgoing program. However in current production practice digital video effects equipment may be used to create complex composite pictures in which contributions from many sources may be present. This is shown in FIG. 1 in which three cameras 4,5,6 are obtaining images of three scenes 1,2,3 and a caption generator 7 is providing the word "SPORTS" and associated graphics. These are combined by the DVE and vision mixer 8 to produce the programme 9 which is seen on the monitor 10. The picture of the bicycle and the racing car are present in the output, so the tally indications are set for cameras 4 and 5, the caption is present so the tally is set for the caption generator. The picture from the camera 6 looking at the skis is not currently being used so its tally indication is not set. In the drawing the tally indications are represented by lights on top of the signal sources, but other forms of display are also commonly used.

SUMMARY OF THE INVENTION

The object of the present invention is to provide a means by which an accurate tally indication can be given, which will reliably mark as in use all the sources which contribute in any way to the current output.

The invention accordingly provides a method of processing a digital video signal, wherein there is provided, in association with a digital picture signal, an accompanying tally signal encoded to identify the source of the picture signal. During processing of the original picture signal the tally signal may be modified in a manner analogous to a key signal so that the identity code of a given picture signal is present only at the instant that the same picture is contributing to the product of a given signal stage. Thus during transformation, mixing or other modification of the original picture, the tally signal may also be correspondingly modified pixel by pixel.

Advantageously the tally signal is provided in such a format that a common signal may carry the identities of a plurality of picture sources. This signal may then be decoded frame by frame at the final picture stage to identify all sources contributing to each frame of the picture.

According to one embodiment of the invention a key signal accompanying the picture signal is encoded as a monochrome picture signal but provided in the format of a colour picture signal, and the unused colour difference component of the coded key signal is encoded to provide the tally signal.

The invention also provides apparatus for carrying out the above process. This may include, for example, means for selecting a video signal from a plurality of signal sources and for providing a key signal including the tally signal, apparatus for selectively combining video signals from a number of sources and correspondingly providing coded key/tally signals identifying the combination of signal sources, or means for decoding the composite key signals and providing from the tally signals included therein an indication of the original signal sources. Such an indication may be visual or may be of the nature of a control signal. This control signal could for example be used to prevent an original picture source from being interfered with when it has been selected by a later processing stage for inclusion in the final picture.

It is common practice to pass television signals between different items of equipment as either parallel or serial digital signals conforming to European Broadcasting Union recommendation 656, or to subsequent revisions of the recommendation This standard allows for a high definition monochrome signal and two lower definition colour difference signals within one digital data stream carried by one cable. It is also common practice to associate a key signal with a picture signal, in order to indicate transparent areas of the picture behind which a background picture can be seen. This signal is commonly encoded as a monochrome picture signal, in which white represents solid picture, black represents transparency, and intermediate levels of grey represent partial transparency.

If this key signal is transmitted from one unit to another as a digital data stream then the part of the stream which would, in a picture, represent the colour difference signals is, in the case of a key signal, unused.

The present invention can make use of this unused capacity in the data transmission to transfer information about the picture sources which are currently in use.

DETAILED DESCRIPTION OF THE PREFERRED EMBODIMENTS

Figure 1:
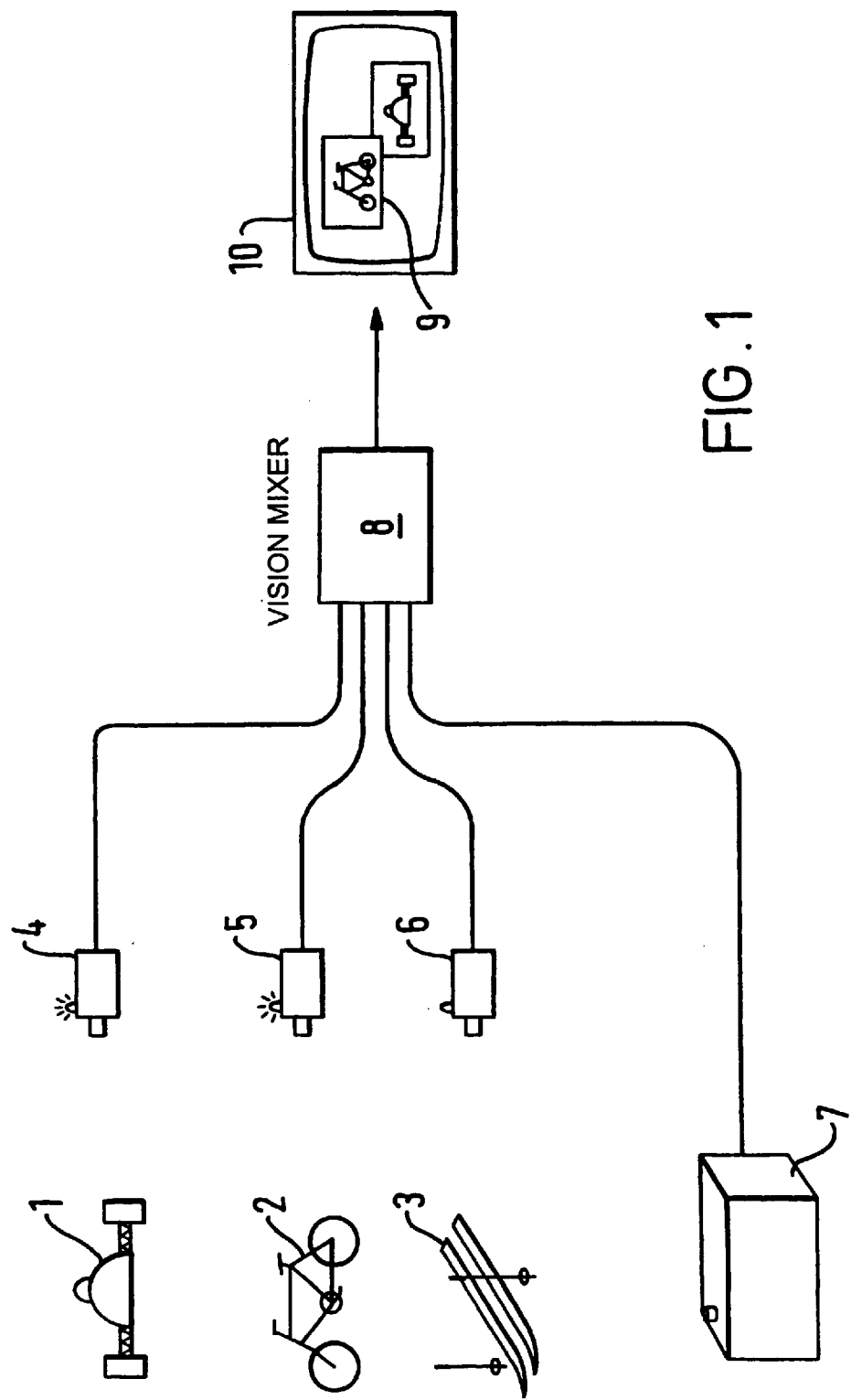
FIG. 1 is a diagrammatic view of a known television signal processing system.
Figure 2:
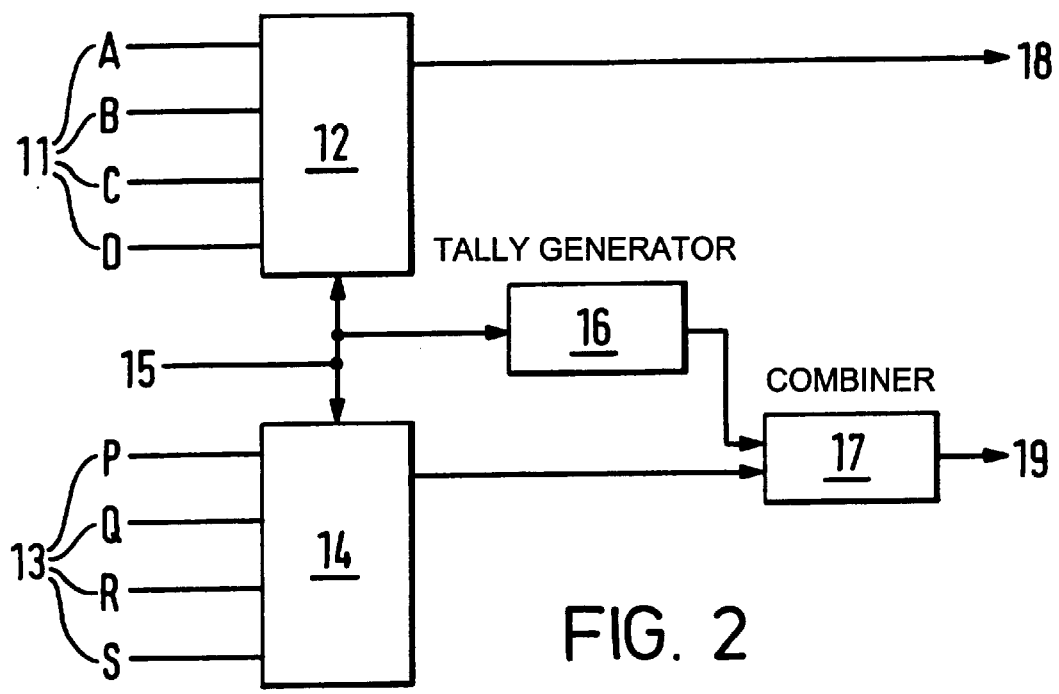
FIG. 2 is a block diagram of an apparatus in accordance with the invention for generating tally signals.

The apparatus of FIG. 2 comprises an input selector and tally inserter. A number of picture inputs 11 and a number of key inputs 13 are supplied to the switches 12 and 14. A control signal derived from the operator controls 15 is used to control the switches to select one key and one video input. This control signal is also used to control the tally generator 16 which generates a colour difference word stream with all bits clear except for the most significant bit and a single bit selected by the control signal. The position of this bit within the word indicates which input is selected by the switches. An arbitrary correspondence can be set up by the operator between the selected source and the bit which is set to represent it. This signal is combined with the switched key signal in the combiner 17 to produce a mixed signal 19 which contains the luminance information of the key signal, and the tally information in the chrominance areas. The switched picture 18 information is passed on to subsequent stages of processing. The switches 12, 14 have been shown with four inputs, but a larger or smaller number of inputs could be used.

Figure 3:
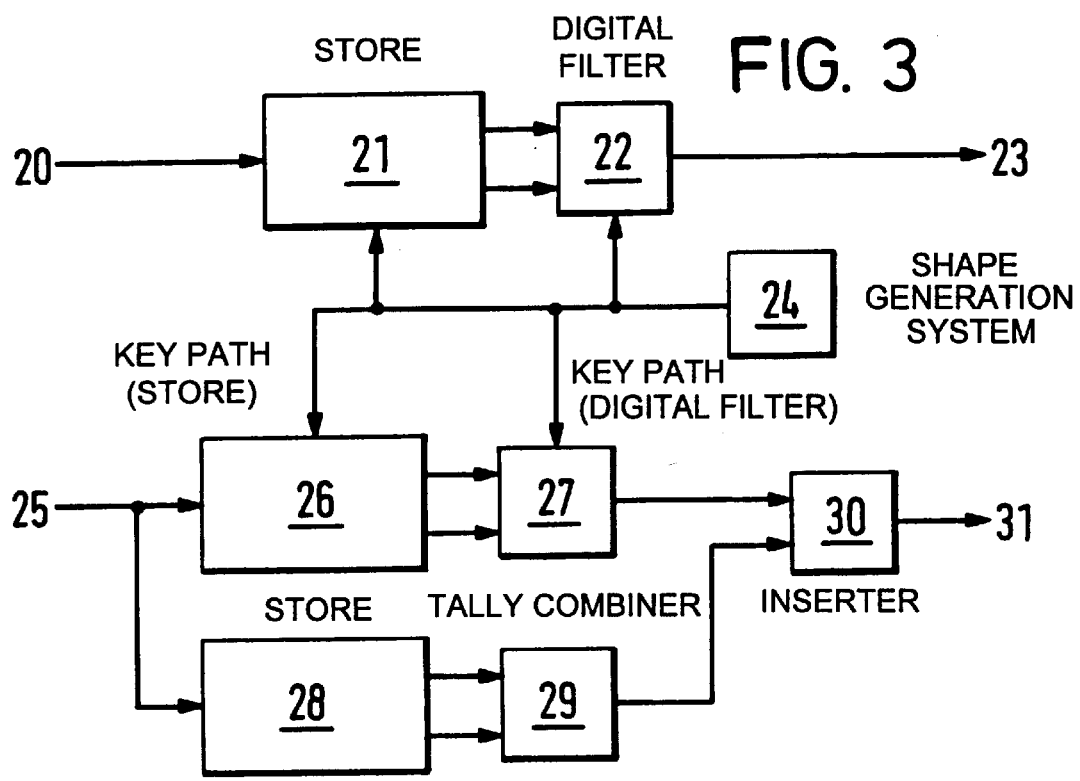
FIGS. 3 and 4 are block diagrams of apparatus in accordance with the invention for processing picture signals including such tally signals and FIG. 5 is a block diagram of an apparatus in accordance with the invention for decoding tally signals.

FIG. 3 shows the tally processing associated with a DVE. The picture information enters by the digital connection 20 and is placed in the store 21. It is extracted through the digital filter 22 under control of the shape generation system 24 and leaves on the digital connection 23. The key signal is similarly processed by the key path 25, 26, 27. Note that the DVE 20 to 27 is assumed to exist, and is not part of this invention. As will be understood by one skilled in the art the store 21 stores pixel information relating to an area of the picture image that is to be transformed and 26 is a similar store for key information.

The tally path, which is part of this invention, comprises the store 28 in which tally bits extracted from the incoming key 25 are stored. This store is then read into the tally combiner 29. This receives data from the area of the store which corresponds to the same area of the source picture as the area which is currently being used by the interpolators or digital filters 22 and 27. As will also be understood by one skilled in the art the picture signal to be processed by the DVE may include image information from different sources in the area defined in the stores 21 and 26. Therefore the store 28 will hold correspondingly different coded tally words generated as described with reference to FIG. 2 and inserted in the video signal for example by a mixer as described below. The tally combiner forms the logical OR of the tally words within the area which it is processing. The bits which are set in this word therefore indicate which sources have made contributions to the final output.

The tally thus produced is reinserted into the key signal in the inserter 30, which is functionally identical to 17, in order to produce the output key 31.

Figure 4:
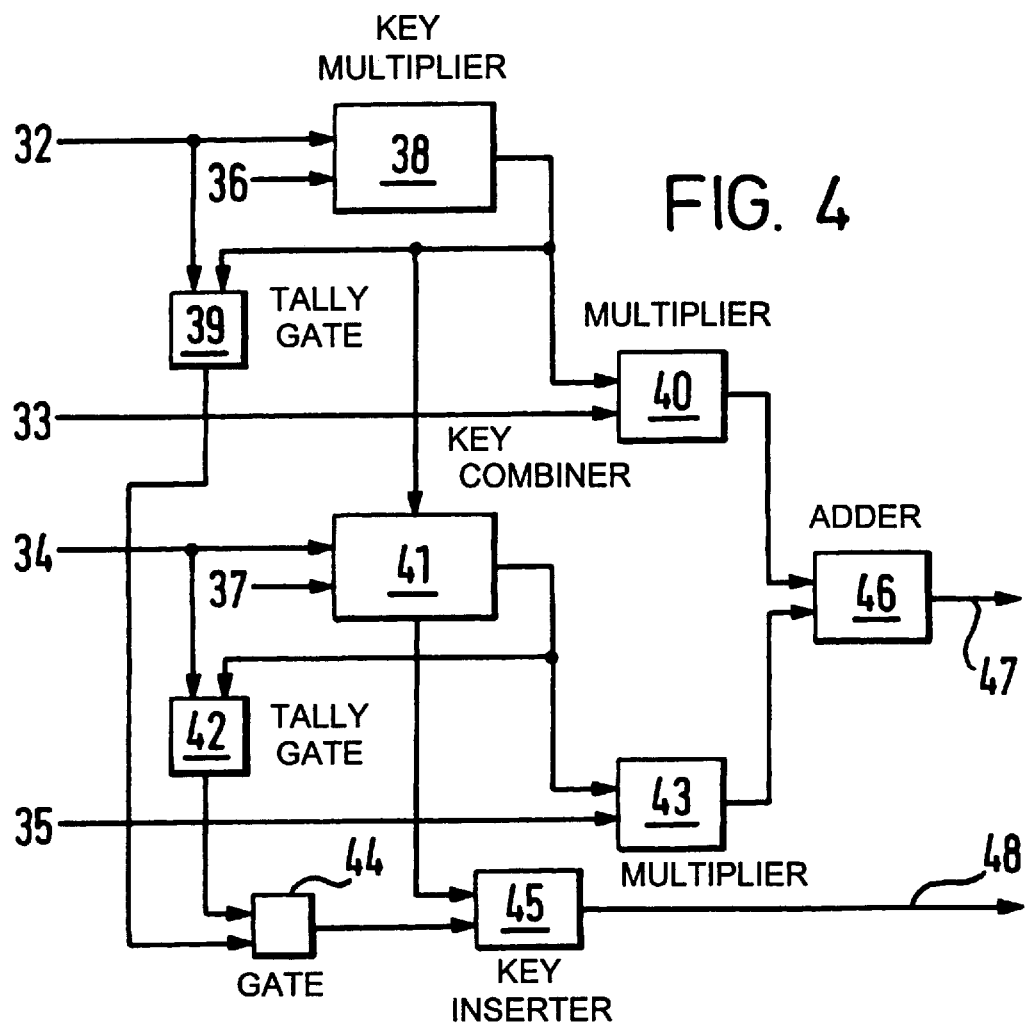

FIG. 4 shows how the tally is processed through a mixer. In this example the mixer combines two signals which each comprise key and video to produce a picture which also comprises key and video. The operation of the mixer is described, but does not form part of this invention.

The way in which the mixer operates is as follows. The picture information which is to appear as the front picture on the final output enters at 33 and its associated key at 32. This key is multiplied 38 by a local key 36, which is under the control of the operator and can be used to wipe or fade the picture. The resulting product is multiplied 40 by the picture information, and passes to the adder 46. The back picture entering at 35 and its key 34 are similarly dealt with at 37,41,42,43 and a mixed picture produced at the output 47. The back picture key is however reduced by the key multiplier 41 such that the front picture, when riot transparent, will cause the back picture to be suppressed. The background key which passes from the key combiner 41 to the inserter 45 represents the solidity of the picture as a whole. If the incoming keys 32,34 are expressed as numbers K1 and K2 which are between 0 and 1 then the outgoing key may be obtained by the expression $1-((1-K1)(1-K2))$.

The tally path, which is part of this invention, indicates which sources are still visible at the output of the mixer. The tally gates 39,42 take in the actual key value which is used to multiply the associated video, and if this key value is non-zero then they pass the tally bits presented at their other inputs to their outputs. If the key value is zero then they produce zero at the outputs.

The resulting tally words are then combined with a logical or gate 44 and reinserted into the key at 45 to produce the combined key and tally signal at output 48.

Figure 5:
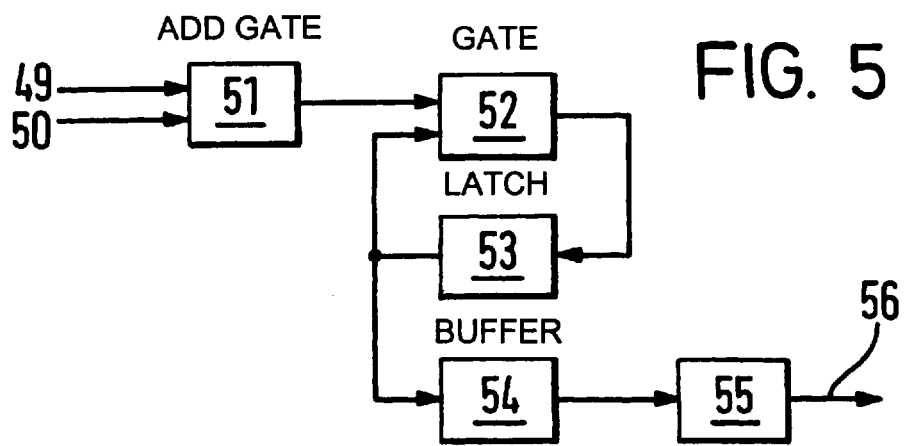

FIG. 5 shows the extractor which obtains the final value of the tally from the tally words. The tally words enter at 49 and are combined by the logical AND gate 51 within a mask word 50. The mask word is arranged to be all ones during the time when valid picture information is present, but all zeros during the blanking intervals. The resulting word passes to the gate 52 which, on every pixel, combines the contents of the latch 53 with the input from the AND gate, and passes the result to the latch to be delayed by one pixel time. The gate is arranged in such a way that it produces the logical OR of its inputs, except for one clock period during vertical blanking, when it produces zero to reset the latch for the next field. Between the end of one field of the picture and the latch being reset, the data in the latch is copied to the buffer 54. This data, which retains stable for a field, is then used to access the look up table 55 which is set up by the control system. This table is used to translate between the data in the buffer, and the identities of the picture sources providing the key and video signals which are in use. The result of this translation is presented at the tally outputs 56. Any suitable means may then be adapted to provide a visual display or other indication of information provided at the output 56.

Although in the above description the latch 53 is reset for each field, it will be appreciated that the latch could be reset for alternate fields so that the information in the buffer 54 relates to a frame rather than a field.

Where two or more parts of the invention are combined within one unit, it may be possible to pass the tally words from one stage to the next without reinserting them into the key. In this case a separate bus would be provided for the tally words and the inserters omitted.

We claim:

1. A method of processing a digital video signal, comprising the following steps: a) providing, in association with each of a plurality of digital picture signals from a plurality of different image sources, an accompanying tally signal encoded to identify a source or sources of each pixel of a picture image represented by an associated picture signal, b) mixing said digital picture signals to provide a resulting video image signal in which image information from at least one of said different sources contributes only to a selected partial area of an image frame of a resulting picture image, and c) mixing the corresponding tally signals, whereby a resulting tally signal associated with the resulting video image signal identifies, for each pixel of the resulting image, only an image source or sources contributing to the image content of that pixel.

2. A method as claimed in claim 1, further comprising the step of controlling the provision of each tally signal in response to selection of a given signal source so that a given picture signal source identity code is present only at the instant that said signal source is contributing to the associated digital picture signal at a given signal stage.

3. A method as claimed in claim 2 further comprising the step of providing said tally signal in such a format that a common signal carries identities of a plurality of picture signal sources.

4. A method as claimed in claim 3, further comprising the step of decoding said tally signal frame by frame, or field by field, at a final picture stage to identify all sources contributing to each frame of the picture.

5. A method as claimed in claim 3, further comprising the step of associating each said digital picture signal with a signal encoded in the format of a colour picture signal, having a luminance component and a chrominance component, such that the luminance component of said signal format provides a key signal relating to the picture signal and the chrominance component of said signal format provides the tally signal.

6. An apparatus for processing digital video signals, comprising means for selectively combining picture signals from a number of sources to provide a resulting video image signal in which image information from at least one of said different sources contributes only to a selected partial area of an image frame of the resulting picture image, means for providing, in association with each of said picture signals, an accompanying tally signal identifying the source of said signal, and means for processing said tally signals to provide, in association with the combined output picture signal, an encoded tally signal identifying each source contributing to each field or frame of said output picture signal.

7. An apparatus as claimed in claim 6, wherein said means for selectively combining picture signals includes first selector switching means having a plurality of picture signal inputs and a single picture signal output and second selector switching means having a plurality of key signal inputs and a single key signal output; said means for providing said tally signal comprises a code signal generator controllable to generate any one of a number of predetermined code signals; and said apparatus further comprises control means for controlling each of said first and second switching means to couple a selected input to the said output thereof and for controlling said code signal generator to generate a corresponding one of said predetermined code signals.

8. An apparatus according to claim 7, further comprising combining means coupled to the output of said second selector switching means and to an output of said code signal generator and arranged to combine signals received from said outputs.

9. An apparatus according to claim 8, wherein said combining means is arranged to provide at an output thereof a signal encoded in the format of a colour picture signal, with the signal received from said second selector switching means provided in the luminance component of said format and the signal received from said code signal generator provided in the chrominance component of said format.

10. An apparatus for use in processing a digital video signal, comprising means for receiving a digital video signal including a first digital picture signal together with a first key signal and an encoded tally signal identifying a source of the first picture signal, means for generating a second key signal for controlling a video effect to be applied to said first digital picture signal, means for modifying said first key signal with said second key signal whereby the modified first key signal defines the presence in a second, mixed picture signal of image information derived from the first picture signal and means for modifying said tally signal with said second key signal whereby said tally signal identifies the source of said first picture signal only when image information from the latter signal is contributing to the second mixed picture signal.

11. An apparatus for use in processing a digital video signal, comprising means for receiving a digital video signal including an encoded tally signal, means for deriving from said tally signal a succession of digital words corresponding to pixels of the said picture signal whereby each bit in each tally word has a value which is determined by the presence or absence in said corresponding pixel of information from a given signal source, and means for combining selected tally words to form the logical OR thereof whereby the resulting single tally word serves to define all signal sources contributing to picture information contained in a corresponding group of pixels.

12. An apparatus as claim 11, wherein said means for selecting said set of tally signals comprises a store for storing tally words corresponding to pixels of a picture area to be processed by a DVE, whereby the resulting single tally word identifies all signal sources contributing to said picture area.

13. An apparatus as claimed in claim 11, wherein said means for selecting said set of tally signals comprises mixing means for receiving tally words corresponding to pixels of images to be mixed, together with associated key signals, and said combining means is arranged to combine said tally words in accordance with the values of the said key signals, whereby the resulting single tally word serves to identify all signal sources contributing to a respective pixel of a mixed picture image.

14. An apparatus as claimed in claim 11, wherein the said selecting means comprises means for receiving consecutive tally words of a video signal and for passing said tally words to said combining means during each field or frame of the video signal, whereby the resulting single tally word identifies all signal sources contributing to the respective field or frame of a picture image.

15. A method of processing a digital video signal comprising the steps of providing, in association with a picture image signal, an accompanying key signal for controlling mixing of said image signal in a subsequent processing step and an accompanying tally signal for identifying a source or sources of picture information contributing to said image signal, whereby the key signal and the tally signal are together incorporated in a signal having a colour picture signal format, comprising a luminance component and a chrominance component, with the key signal provided by the luminance component and the tally signal provided by the chrominance component.

16. An apparatus for processing digital video signals, comprising:
  a) means for selectively combining picture signals from a number of sources, including 1) first selector switching means having a plurality of picture signal inputs and a single picture output and 2) second selector switching means having a plurality of key signal inputs and a singly key signal output;
  b) means for providing, in association with the combined output picture signal, an encoded tally signal identifying each source contributing to said output picture signal, including a code signal generator controllable to generate any one of a number of predetermined code signals;
  c) control means for controlling each of said first and second switching means to couple a selected input to the output thereof and for controlling the code signal generator to generate a corresponding one of said predetermined code signals;
  d) combining means coupled to the output of said second selector switching means and to an output of said code signal generator and arranged to combine signals received from said outputs, said combining means being arranged to provide, at an output thereof, a signal encoded in a colour picture signal format, having a luminance component and a chrominance component, with the signal received from said second selector switching means provided in the luminance component of said format and the signal received from said code signal generator provided in the chrominance component of said format.

17. An apparatus for use in processing a digital video signal, comprising:
   a) means for receiving a digital video signal, including a digital picture signal together with an encoded tally signal;
   b) means for processing said tally signal to provide an identification of signal sources contributing to said picture signal, said means comprising means for providing said tally signal in the form of a succession of digital words corresponding to pixels of said picture signal, whereby each bit value in each tally word is determined by the presence or absence in said corresponding pixel of information from a given signal source;
   c) means for selecting a set of tally words corresponding to a predetermined set of pixels of at least one picture signal; and
   d) means for combining said set of tally words to form the logical OR thereof, whereby the resulting single tally word serves to identify all signal sources contributing to picture information contained in said set of pixels.

18. An apparatus as claimed in claim 16, wherein said means for selecting said set of tally signals comprises a store for storing tally words corresponding to pixels of a picture area to be processed by a DVE, whereby the resulting single tally word identifies all signal sources contributing to said picture area.

19. An apparatus as claimed in claim 16, wherein said means for selecting said set of tally signals comprises mixing means for receiving tally words corresponding to pixels of images to be mixed, together with associated key signals, and said combining means is arranged to combine said tally words in accordance with the values of the said key signals, whereby the resulting single tally word serves to identify all signal sources contributing to a respective pixel of a mixed picture image.

20. An apparatus as claimed in claim 16, wherein the said selecting means comprises means for receiving consecutive tally words of a video signal and for passing said tally words to said combining means during each field or frame of the video signal, whereby the resulting single tally word identifies all signal sources contributing to the respective field or frame of a picture image.

* * * * *